United States Patent
Rana et al.

(10) Patent No.: US 9,935,556 B1
(45) Date of Patent: Apr. 3, 2018

(54) PRIMARY-SIDE CONTROL OF RESONANT CONVERTERS

(71) Applicant: SEMICONDUCTOR COMPONENTS INDUSTRIES, LLC, Phoenix, AZ (US)

(72) Inventors: Dibyendu Rana, Milpitas, CA (US); Zhao-Jun Wang, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/418,340

(22) Filed: Jan. 27, 2017

(51) Int. Cl.
| | | |
|---|---|---|
| *H02M 3/335* | (2006.01) | |
| *H02M 1/08* | (2006.01) | |
| *H02M 1/32* | (2007.01) | |
| *H02M 1/00* | (2006.01) | |

(52) U.S. Cl.
CPC ......... *H02M 3/33507* (2013.01); *H02M 1/08* (2013.01); *H02M 1/32* (2013.01); *H02M 2001/0009* (2013.01)

(58) Field of Classification Search
CPC ............. H02M 3/335; H02M 3/33569; H02M 3/33507; H02M 3/33515; H02M 3/33523; H02M 3/3155; H02M 3/25; H02M 2007/4815
USPC .. 363/20, 21.01, 21.02, 21.03, 21.12, 21.13, 363/21.15, 21.16, 21.17, 131
See application file for complete search history.

(56) References Cited

U.S. PATENT DOCUMENTS

| | | | | |
|---|---|---|---|---|
| 8,471,488 | B1* | 6/2013 | Hopkins | H02M 1/4258 315/247 |
| 2008/0084198 | A1* | 4/2008 | Baurle | H02M 3/335 323/288 |
| 2012/0200229 | A1* | 8/2012 | Kunst | H05B 33/0815 315/186 |
| 2012/0230069 | A1* | 9/2012 | Tzeng | H02M 1/36 363/49 |
| 2013/0094247 | A1* | 4/2013 | Kleinpenning | H02M 3/33523 363/16 |
| 2014/0268951 | A1* | 9/2014 | Wang | H02M 7/12 363/78 |
| 2016/0020691 | A1* | 1/2016 | Yoon | H02M 1/4258 323/284 |
| 2016/0043648 | A1* | 2/2016 | Usami | H02M 1/12 363/21.12 |

(Continued)

*Primary Examiner* — Adolf Berhane
(74) *Attorney, Agent, or Firm* — Robert F. Hightower (57) ABSTRACT

A method for controlling a resonant converter includes maintaining an output current equal to an output power of the converter divided by an output voltage of the converter in response to a secondary current of a transformer being greater than or equal to a maximum output current. The output power is maintained at a constant output power in response to the output power being greater than or equal to a maximum output power, and the secondary current being less than the maximum output current. Maintaining the output current ratio and the constant output power each comprises changing the duty cycle of a primary-side switch configured to gate a primary current of the transformer. The output voltage is limited to a maximum output voltage in response to the secondary current being less than the maximum output current, and the output power being less than the maximum output power.

20 Claims, 9 Drawing Sheets

(56) References Cited

U.S. PATENT DOCUMENTS

| | | | |
|---|---|---|---|
| 2016/0094130 A1* | 3/2016 | Yang | H02M 3/33561 363/21.12 |
| 2016/0111961 A1* | 4/2016 | Balakrishnan | H02M 3/33507 363/21.12 |
| 2016/0380528 A1* | 12/2016 | Gao | H02M 1/15 363/21.12 |
| 2017/0201180 A1* | 7/2017 | Jacques | H02M 3/33507 |
| 2017/0264206 A1* | 9/2017 | Rana | H02M 3/33569 |
| 2017/0338744 A1* | 11/2017 | Huang | H02M 3/33507 |

* cited by examiner

Discontinuous Conduction Mode

FIG. 7

Continuous Conduction Mode

PRIMARY-SIDE CONTROL OF RESONANT CONVERTERS

FIELD

This disclosure relates generally to power conversion, and more specifically to regulating current and power for converters using resonant topologies.

BACKGROUND

Flyback converters are well suited for applications requiring a wide input voltage range, or a high voltage output with galvanic isolation between the input and output of the converter. The operation of a flyback converter begins by grounding a primary side of a transformer with a switch. Consequently, current flows in the primary, thus inducing a magnetic flux in the core of the transformer, which tends to oppose the primary current. By choosing a transformer with reverse polarity windings, (e.g. the secondary windings are wound on the core in the opposing rotational direction to the primary windings), the secondary current will not flow when the primary current flows, due to the blocking action of a rectifying diode on the secondary side. When the primary current is terminated, the magnetic flux in the core will induce a secondary current in an opposing direction to the flux, which will transfer the stored energy from the core to the secondary side with appropriate voltage amplification depending upon the transformer's turns ratio.

Conventionally, the amplitude of the primary current is used to estimate the amplitude of the secondary current, and thus enable current regulation of the converter. The flyback converter has a resonant topology wherein an oscillating resonant waveform will be presented to the switch on the primary side due to a leakage inductance of the transformer and a capacitance of the switch. The resonant waveform causes a negative current to flow through the switch, thus introducing an error in conventional methods of current regulation. There may also be high frequency oscillations or ringing across the switch due to the rapid activation of the switch interacting with the leakage inductance. Furthermore, it is desirable to regulate the converter based on power consumption as well as current to facilitate the design and operation of the converter, while maintaining galvanic isolation between the primary and secondary sides.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the regulation of converters employing resonant topologies. In particular, this disclosure describes the regulation of flyback converters with nested control loops to control output current, output power and output voltage. Errors due to the bidirectional current flow from resonant waveforms and high frequency oscillations due to inductive switching are eliminated, while maintaining galvanic isolation between the input and output of the converter.

Figure 1:
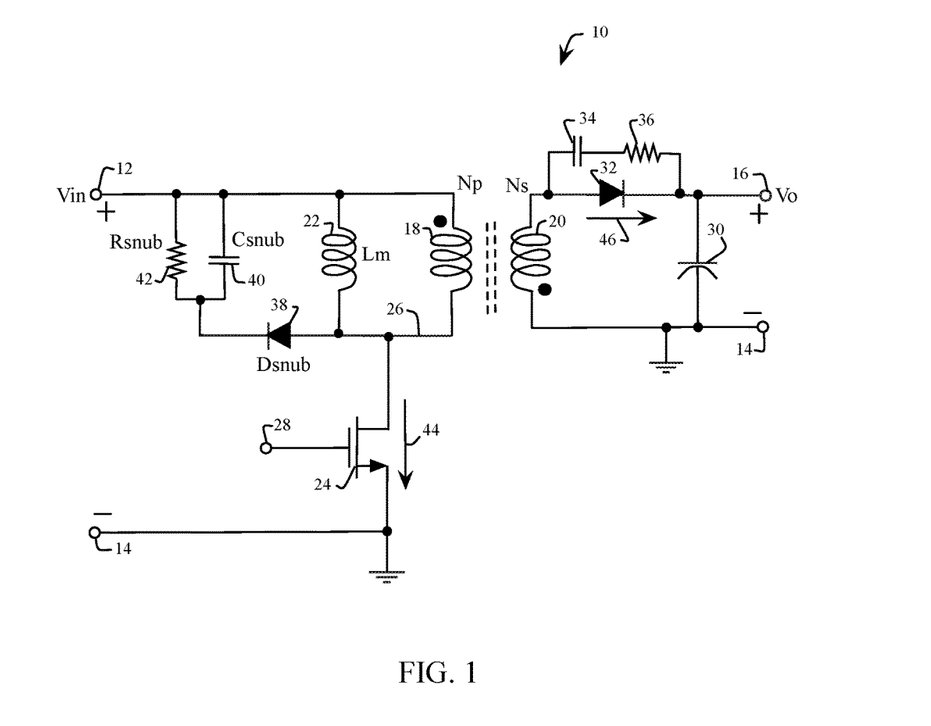
FIG. 1 is schematic view of an embodiment of a flyback converter.

FIG. 1 shows an embodiment 10 of a flyback converter for converting an input voltage (Vin) 12 referenced to ground 14, to an output voltage (Vo) 16 referenced to ground 14. A transformer includes a primary winding 18 magnetically coupled to a secondary winding 20 with reverse polarity as schematically indicated by the winding "dots." A magnetizing inductor (Lm) 22 is in parallel with the primary winding 18. In various embodiments, the magnetizing inductor 22 is physically part of the primary winding 18 but shown separately for simulation purposes and to represent the portion of the transformer that supports the magnetic flux generated by the primary winding 18. A primary-side switch 24 connects to the primary winding 18 at terminal 26. The primary-side switch 24 is turned on, or "activated" by a gate signal 28. The secondary winding 20 is connected to a secondary capacitor 30 through a diode 32 in parallel with a passive filter formed by a capacitor 34 in series with a resistor 36. The primary winding 18 connects to a snubber designed to suppress high frequency oscillations from discontinuous current flow through leakage inductor (not shown) when the primary-side switch 24 is deactivated. The snubber includes a diode 38 in series with a filter formed by a capacitor 40 and a resistor 42.

When the primary-side switch 24 is activated with the gate 28, a sensing current 44 flows through the primary-side switch 24, the primary winding 18, and the magnetizing inductor 22, thus generating an opposing magnetic flux. Current does not flow in the secondary winding because of the reverse polarity of the secondary with respect to the primary, and due to the blocking action of the diode 32. When the primary-side switch 24 is subsequently deactivated, the stored magnetic flux generates a secondary current 46 that attempts to sustain the flux, thus charging the secondary capacitor 30 and providing the output voltage 16.

Figure 2:
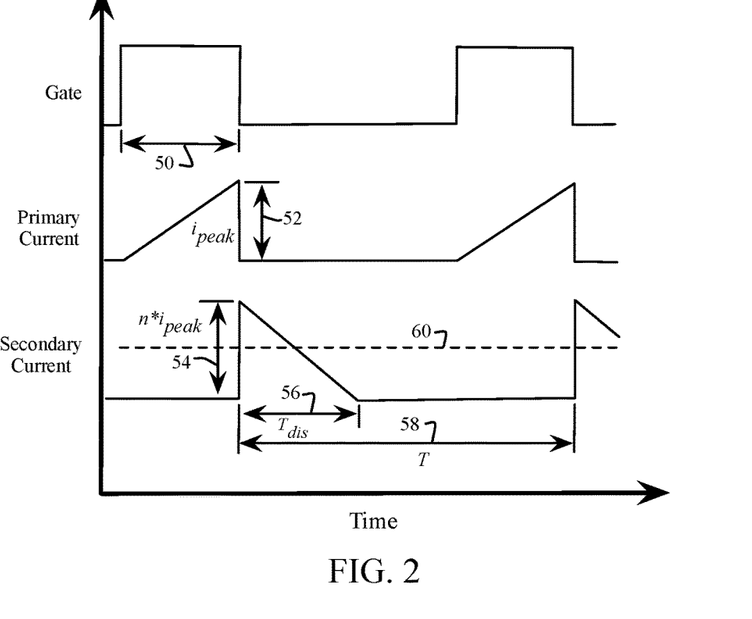
FIG. 2 is a graphical view of the primary and secondary current waveforms of the converter shown in FIG. 1, using Discontinuous Conduction Mode (DCM).
Figure 3:
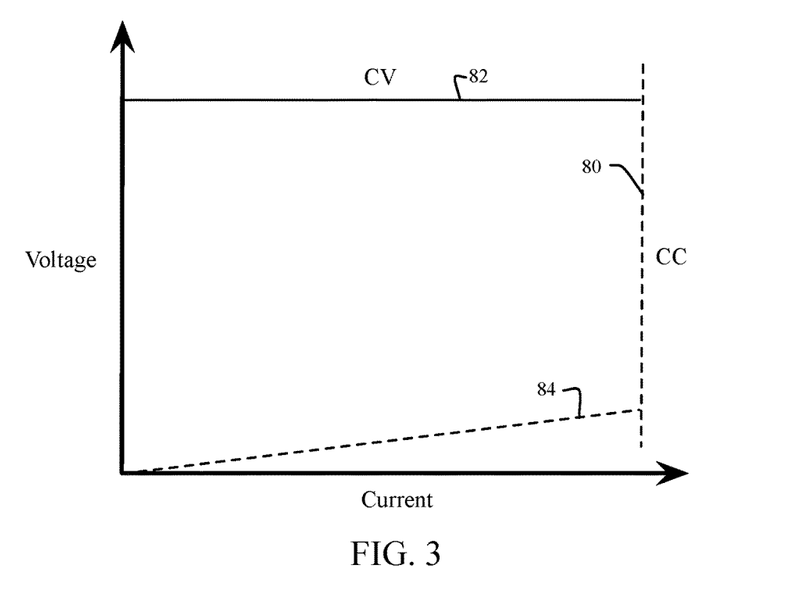
FIG. 3 is a graphical view of a current regulation of the converter shown in FIG. 1.

FIG. 2 and FIG. 3, with continued reference to FIG. 1, shows a conventional method of calculating output current for current regulation of a flyback converter. In FIG. 2, the gate 28 is activated for an activation, (or charging), duration 50. A primary current is determined by the sensing current 44 with a peak current (ipeak) 52. Following deactivation of the gate 24, a secondary current flows in the secondary winding with a peak current (n*ipeak) 54, where "n" is the "turns ratio" (e.g. ratio of the number of windings of the primary winding divided by the number of windings of the secondary winding). For example, if the secondary has ten times the windings of the primary, the secondary current will be one tenth of the primary current. The secondary current flows for a discharge duration (Tdis) 56 and with a period (T) 58. Accordingly the average output current 60 is given by the following formula, wherein the secondary current is divided by two and multiplied by the duty cycle:

$$Iout = \frac{1}{2} * n * ipeak * (Tdis/T)$$

Referring to FIG. 3, regulation of the flyback converter 10 includes a constant voltage (CV) limitation 82 and a constant current (CC) limitation 80. The flyback converter also requires a minimum operating voltage floor 84.

Figure 4:
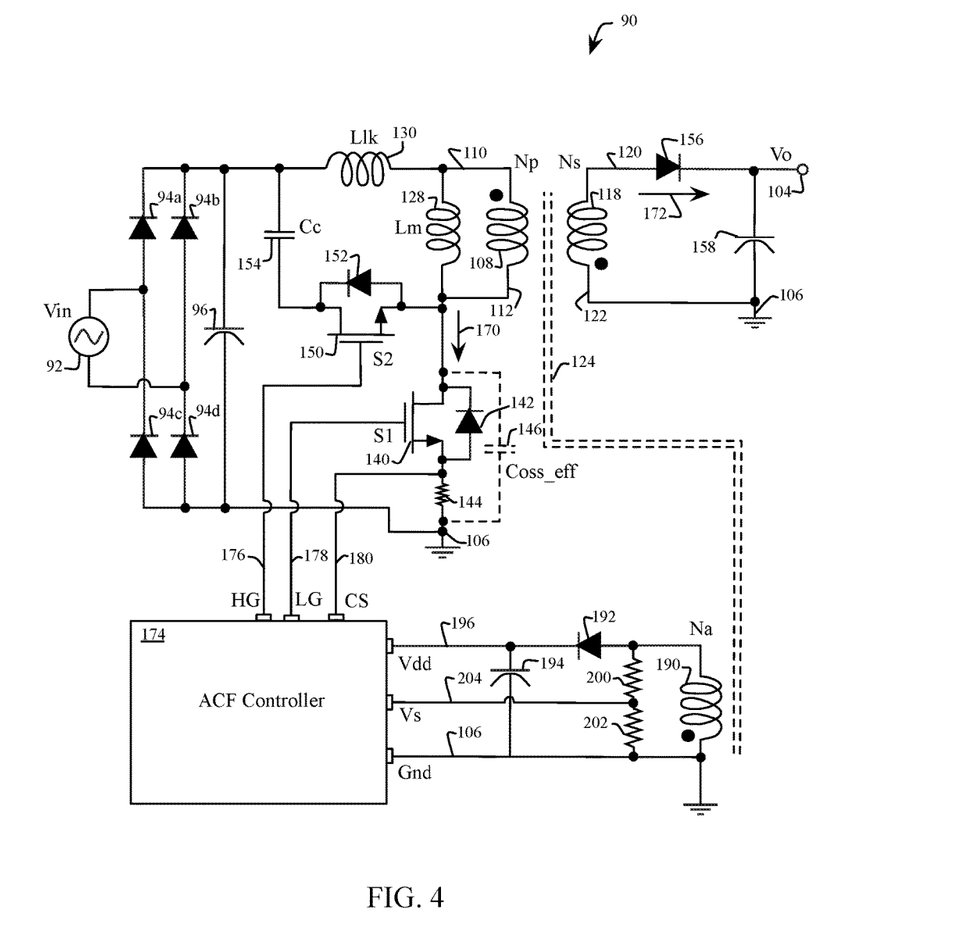
FIG. 4 is a schematic view of a flyback converter in accordance with an embodiment of the present disclosure.

Turning now to FIG. 4, an embodiment 90 of a flyback converter is shown with improved regulation. In some embodiments, an alternating input voltage 92 is rectified with a bridge rectifier including diodes 94a, 94b, 94c and 94d, (generally 94), and an input capacitor 96. In other embodiments, a direct current (dc) input voltage is provided directly to the flyback converter 90 without rectification with diodes 94 or with the input capacitor 96. The flyback converter 90 converts the input voltage 92 to an output voltage 104 referenced to ground 106. In various embodiments, the output voltage 104 is referenced to a second floating potential to provide a bipolar output.

The flyback converter 90 includes a primary winding 108 between a first terminal 110 and a second terminal 112. The primary winding 108 is magnetically coupled with reverse polarity (as indicated by the winding "dots") to a secondary winding 118 connected between a third terminal 120 and a fourth terminal 122. The primary and secondary windings are magnetically coupled with a core 124. The primary winding 108, the core 124 and the secondary winding 118 are part of transformer that further includes a magnetizing inductor 128 and a leakage inductor 130, shown separately in the schematic of FIG. 4 for ease of discussion. The primary winding 108 is connected to a first switch 140 (also referred to as a low side LG switch). The first switch 140 (e.g. a primary-side switch) includes a body diode 142. In various embodiments, the first switch is connected in series with a sensing resistor 144, which is connected to ground 106. In other embodiments, the sensing resistor 144 is interposed in series between the primary winding 108 and the first switch 140. The first switch 140 further includes an effective capacitor (Coss_eff) 146, which will form a resonant circuit with the magnetizing inductor 128.

The embodiment 90 of the flyback controller includes an active clamp circuit formed by a second switch 150 (also referred to as a high side HG switch), in parallel with a body diode 152, and connected to the output of the bridge rectifier by a clamp capacitor 154. The output of the secondary winding 118 is rectified by a secondary diode 156 and secondary capacitor 158. Upon activating the first switch 140, a sensing current 170 flows through the primary winding 108 and magnetizing inductor 128, and develops an opposing magnetic flux in the magnetizing inductor 128. Current does not flow in the secondary winding because the secondary diode 156 is reverse biased. Subsequently deactivating the first switch 140 causes a secondary current to flow in the secondary winding 118 in an attempt to maintain the magnetic flux. A back electromotive force from the secondary winding to the primary winding prevents the resonant circuit formed by the magnetizing inductor 128 and the effective capacitor 146 from resonating. After the magnetic flux is depleted, the resonant circuit will cause a dampened oscillation at the second terminal 112.

An active flyback (ACF) controller 174 generates the high side gate signal 176 for the second switch 150, and the low side gate signal 178 for the first switch 178. The ACF controller also receives a current sense signal 180 as a voltage across the sensing resistor 144, proportional to the sensing current 170. An auxiliary winding (Na) 190 is magnetically coupled through the core 124 to the primary winding 108. The auxiliary winding 190 receives energy from the magnetic flux during the discharge phase (when current also flows in the secondary winding) but is referenced to the primary side of the transformer, hence still maintains galvanic isolation between the primary and secondary sides of the transformer formed in part by the primary winding 108 and the secondary winding 118. The current from the auxiliary winding 190 is rectified by an auxiliary diode 192 and auxiliary capacitor 194, as shown in FIG. 4, to produce a power source (Vdd) 196 for the ACF controller.

A voltage across the auxiliary winding 190 is divided by a first resistor 200 and a second resistor 202 to provide a sensed voltage (Vs) 204, proportional to the input voltage 92 and also related to the output voltage 104 through the turns ratio of the transformer. In various embodiments, the number of winding turns of the auxiliary winding 190 can be adjusted relative to the primary winding 108 with corresponding changes to the values of either the first resistor 200, the second resistor 202, or both 200 and 202 to compensate for voltage multiplication due to the turns ratio between the primary winding 108 and the auxiliary winding 190.

Figure 5:
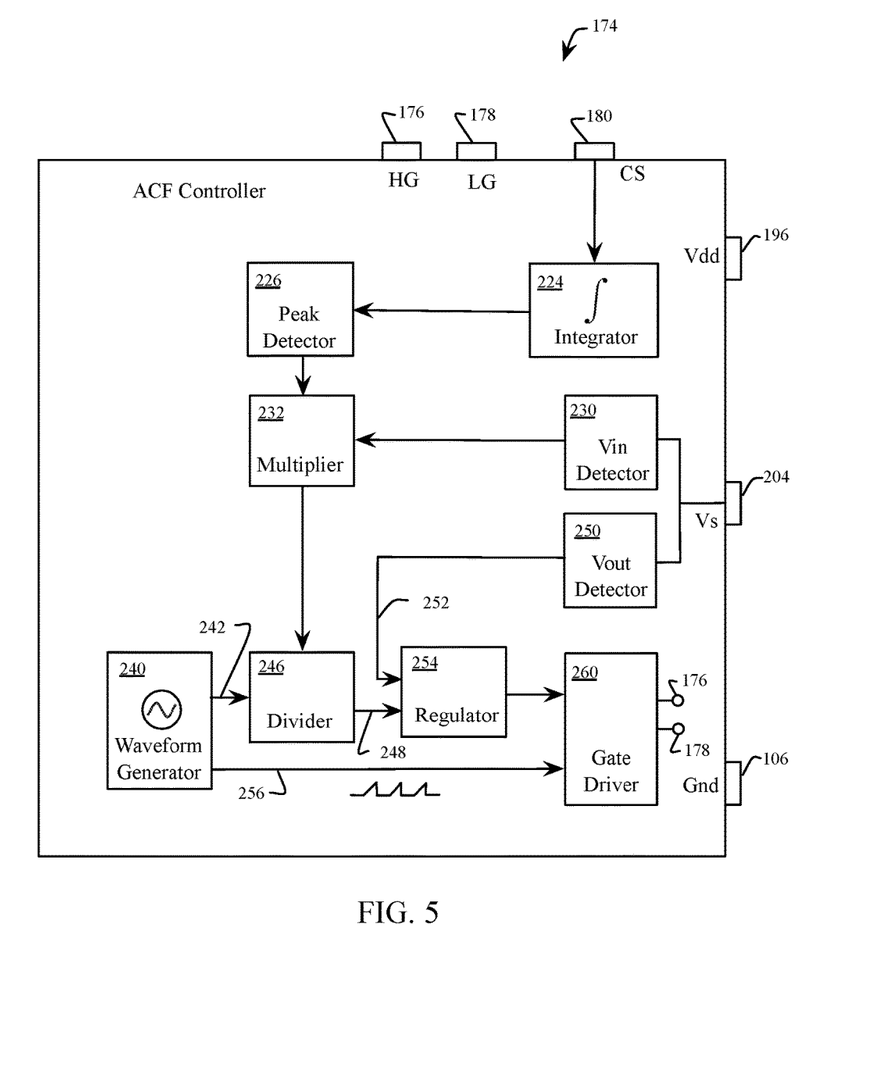
FIG. 5 is a functional block diagram of a controller for the flyback converter shown in FIG. 4, in accordance with an embodiment of the present disclosure.

FIG. 5, with continued reference to FIG. 4, describes functional blocks of the ACF controller 174. In contrast to the method for calculating the average output current as previously described with reference to FIG. 2 and FIG. 3, the embodiment of an ACF Controller 174 accounts for the bidirectional current flow through the first switch 140 on the primary-side. The bidirectional current flow is due to the resonance of the magnetizing inductor 128 and Coss_eff 146 after the secondary current stops flowing due to depletion of the magnetic flux. The improved method of calculating the average output current compensates for the negative current flow (ineg) though the first switch 140 as given by the formula:

$$Iout = \frac{1}{2} * n * (ipeak - ineg) * (Tdis/T)$$

More specifically, in one embodiment the current sense signal 180 is filtered by a low pass filter (LPF) to remove the high frequency oscillation due to the activation of the first switch 140, prior to being received by the integrator 224. Subsequently, the integrator 224 integrates the filtered current sense signal 180 for an activation period during which the first switch 140 is active. In another embodiment, the integrator 224 integrates the current senses signal 180 directly, without filtering with a separate LPF, by adjusting the input bandwidth of the integrator 224 to filter the aforementioned high frequency oscillations. A peak of the integrated current from the integrator 224 is then detected by a peak detector 226.

The input voltage (Vin) 92 is detected from the sensed voltage 204 by a Vin detector 230 wherein the current flowing through the auxiliary winding 190 during the discharge phase (when switch 140 is activated) mirrors the current flowing through the primary winding 108 during the charging phase (when switch 140 is deactivated). In various embodiments, the Vin detector 230 detects the peak level of Vin 92 and calculates a root mean square (RMS) value of Vin 92 for calculating RMS output power. In another embodiment, the Vin detector 230 provides the peak level of Vin 92 for calculating peak output power. The detected Vin from the Vin detector 230 is multiplied by the peak of the integrated primary current from the peak detector 226 at the multiplier 232.

A waveform generator 240 provides an activation duration (Tsw) 242 as a value equal to the duration that the first switch 140 is activated (e.g. on) during the charging phase. The activation duration 242 is comparable to the discharge time (Tdis) and is substituted in the previous formula for Iout. Specifically, magnetic flux is generated at a certain rate during the activation duration Tsw when current is flowing in the primary winding, and the generated magnetic flux is depleted at the same rate when the secondary current is flowing thus defining the discharge time Tdis. The divider 246 provides a calculated output power 248 given by the following formula:

$$\text{Output Power} = Vin * (\int Isense.dt)/Tsw$$

The output voltage (Vout) 104 is detected from the sensed voltage 204 by a Vout detector 250 in a similar manner to the detection of Vin 92 by the Vin detector 230. The Vout detector 250 multiplies a detected input voltage by the turns ratio of the primary winding 108 and the secondary winding 118 to provide the calculated output voltage 252. In various embodiments, the Vout detector samples the sensed voltage 204 at a "knee point" where the secondary current stops flowing, and prior to the onset of resonance between the magnetizing inductor 128 and the Coss_eff 146 on the primary side.

The calculated output power 248 and the calculated output voltage 252 are input to a regulator 254, which drives a gate driver 260. The waveform generator 240 provides a charging pulse 256, having a duration equal to the activation duration and a period equal to the activation period, to the gate driver 260. The gate driver 260 provides the high side gating signal 176 for the second switch 150 and the low side gating signal 178 for the first switch 140 (also "primary-side switch"). The regulator 254 controls a duty cycle of the charging pulse 256 at the gate driver 260 to maintain an operation of the flyback converter 90 within maximum current, power and voltage limits as described with reference to the following figures. The duty cycle is defined as the ratio of the activation duration divided by the activation period. In one embodiment, the regulator 254 controls the duty cycle by changing a width of the activation duration without changing the activation period. In another embodiment, the regulator 254 controls the duty cycle by changing the activation period without changing the activation duration. FIG. 6 to FIG. 9 will describe the regulation of the regulator 254 in further detail.

Figure 6:
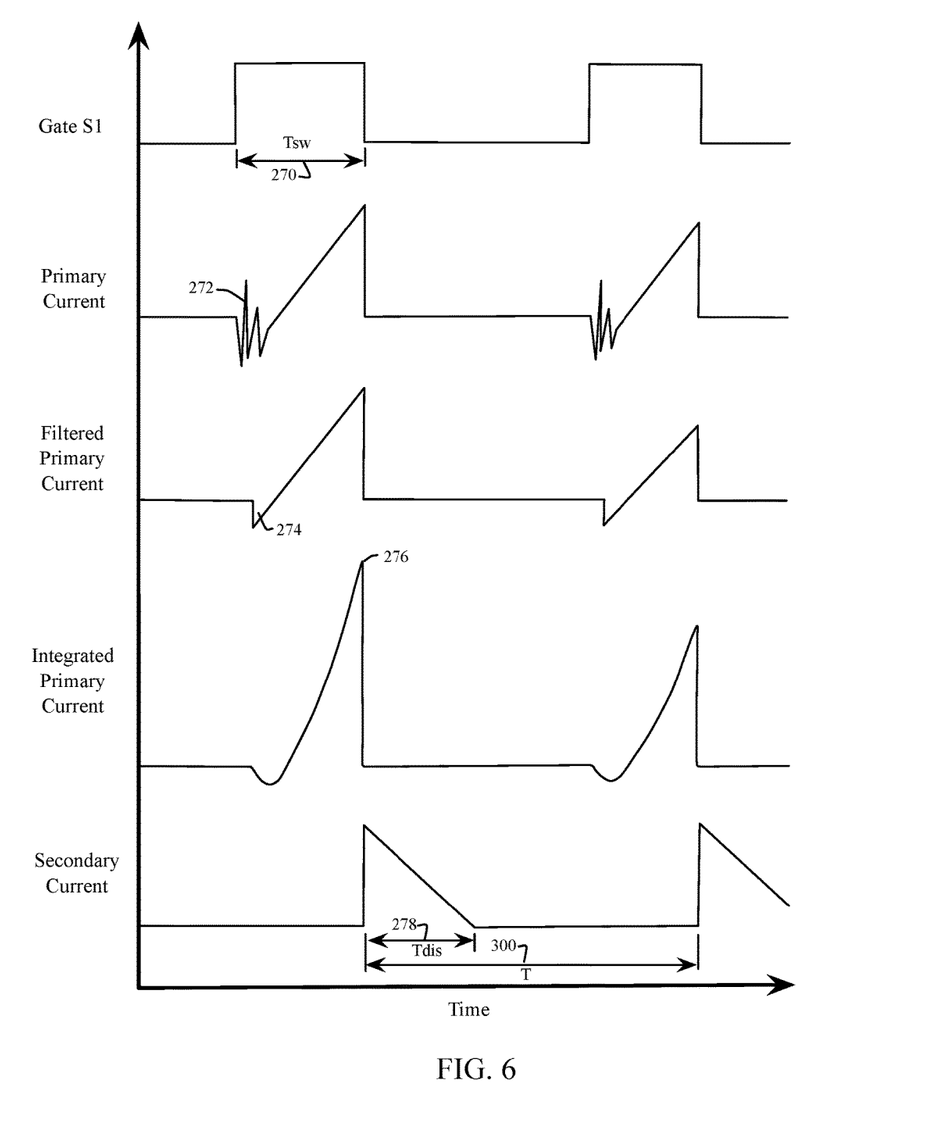
FIG. 6 is graphical view of the primary and secondary current waveforms of the converter shown in FIG. 4, using DCM.

Referring to FIG. 6, the Gate S1 signal for activating the first switch 140 has an activation duration (Tsw) 270 during the charging phase when magnetic flux is developed. During the activation duration 270, the primary current ramps with an initial high frequency oscillation 272. A filtered primary current as output by an LPF or filtered by the Integrator 224 of FIG. 5 will remove the high frequency oscillation 272 but a negative current region 274 still exists. By integrating the primary current or the filtered primary current with the integrator 224, an integrated primary current is generated with a peak 276, detectable by the peak detector 226. In various embodiments, the peak detector 226 of FIG. 5 will hold the peak value 276 for subsequent calculation of the calculated output power 248. After the Gate S1 signal terminates, the secondary current will start and will ramp down to its initial value over a discharge period (Tdis) 278 for a system operating in a discontinuous conduction mode (DCM). For a system operating in a continuous conduction mode (CCM), the secondary current discharges to zero right before the activation period 300 terminates, then starts the next switching cycle. The process of charging and discharging to transfer power then repeats with an activation period 300.

Figure 7:
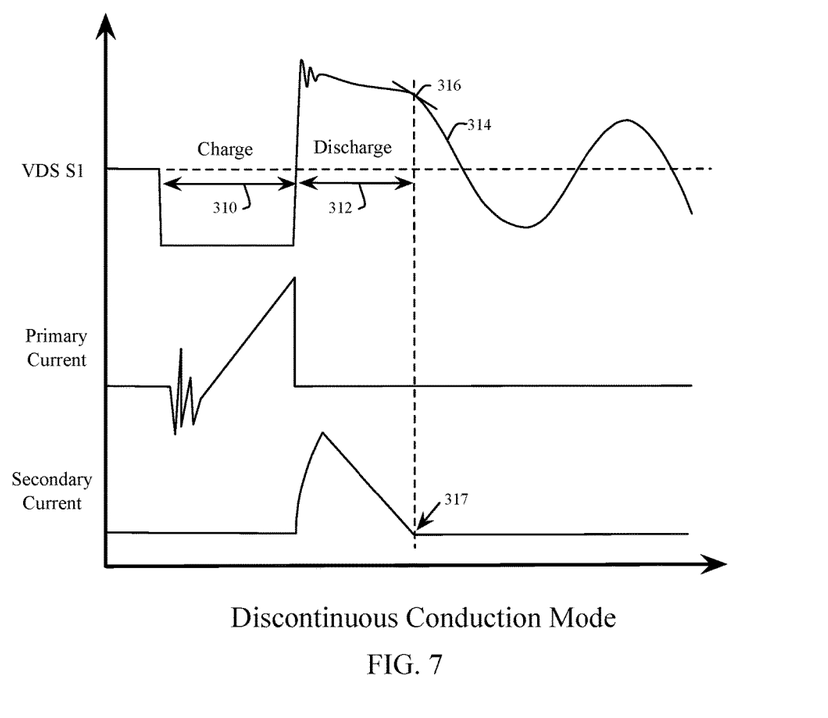
FIG. 7 is a graphical view with further detail of the secondary current waveform of FIG. 6, using DCM.
Figure 8:
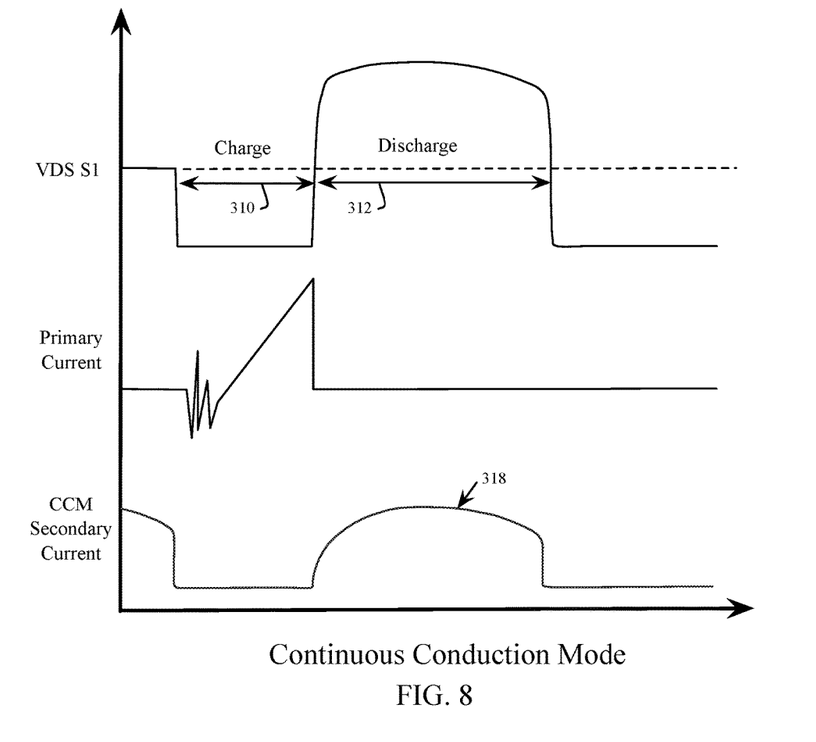
FIG. 8 is a graphical view of the primary and secondary current waveforms of the converter shown in FIG. 4, using Continuous Conduction Mode (CCM).

FIG. 7, with reference to FIG. 4, shows a DCM flyback waveform VDS S1 measured at the second terminal 112, the primary current flowing through the primary winding 108 and the resulting DCM secondary current flowing through the secondary winding 118. The waveform VDS S1 shows a charge phase 310 when the primary current flows, a discharge phase 312 when the secondary current flows, and a period of dampened oscillation 314 from the resonance between the magnetizing inductor 128 and the Coss_eff 146 following termination of the back electromotive force from the secondary current. In various embodiments of a DCM system, the output voltage detected by the Vout detector 250 is sampled at the knee point 316 where the secondary current is minimal (at point 317), thereby establishing a "Set Point" for power calculations. FIG. 8 shows a CCM system for comparison to the DCM system of FIG. 7. In various embodiments of the CCM system of FIG. 8, the output voltage detected by the Vout detector 250 is sampled at a mid-point 318 of the CCM secondary current waveform, substantially equidistant between consecutive Gate S1 activation pulses. The teachings of this disclosure are applicable to both DCM and CCM systems, as depicted in FIG. 7 and FIG. 8 respectively.

Figure 9:
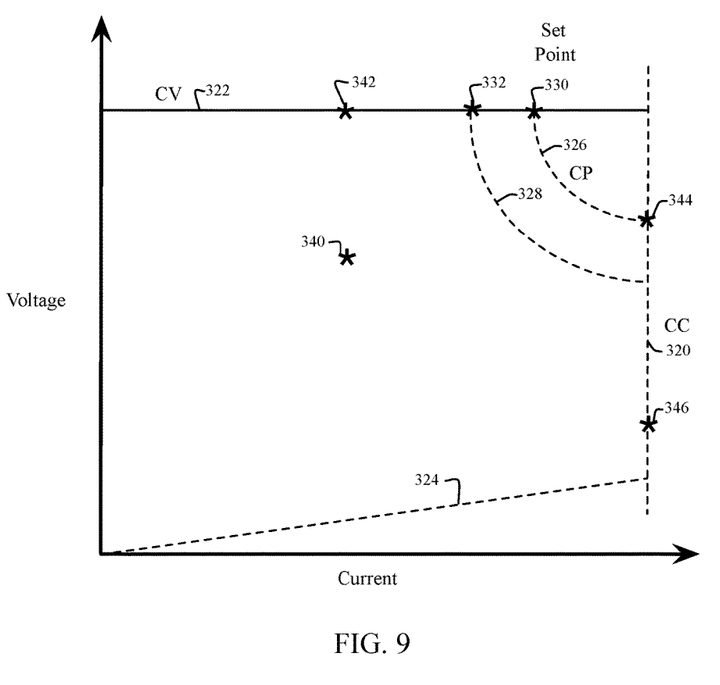
FIG. 9 is a graphical view of current, power and voltage regulation of the converter shown in FIG. 4.

FIG. 9, with reference to FIG. 5 shows the regulation of the flyback converter according to various embodiments described herein. Building upon FIG. 3, the regulation of the converter in FIG. 9 includes regulation with a constant current (CC) 320, a constant voltage (CV) 322 and a constant power (CP) 326, in addition to the voltage floor 324 required for minimal operation (e.g. operation is limited by the requirement to forward bias a diode and to overcome other inherent losses). For example, in one embodiment, a set point 330 is determined by the Vout detector 250, thereby defining a CP limit 326. In contrast, in another embodiment a set point 332 is determined, thereby defining a lower CP limit 328. For the example where the set point 330 is used, an operating point 340 satisfies the CV 322, CP 326 and CC 320 limits. As the output voltage is increased, by increasing Vin, the operating point will shift to 342 where the maximum output voltage is reached. From operating point 342, if the output current (e.g. secondary current) is increased, the CP limit will be reached at the operating point 330. If further increases in output current are needed, the output voltage will need to be reduced to stay on the CP 326 curve, until the operating point 344 is reached. The CP 326 curve represents operation at a constant output power. At the operating point 344, further increases in operating current are limited by the CC limit 320, which controls the output current as a fixed output current ratio equal to the output power divided by the output voltage. For example, moving from the operating point 344 to 345 will require a proportional reduction in both output power and output voltage.

Figure 10:
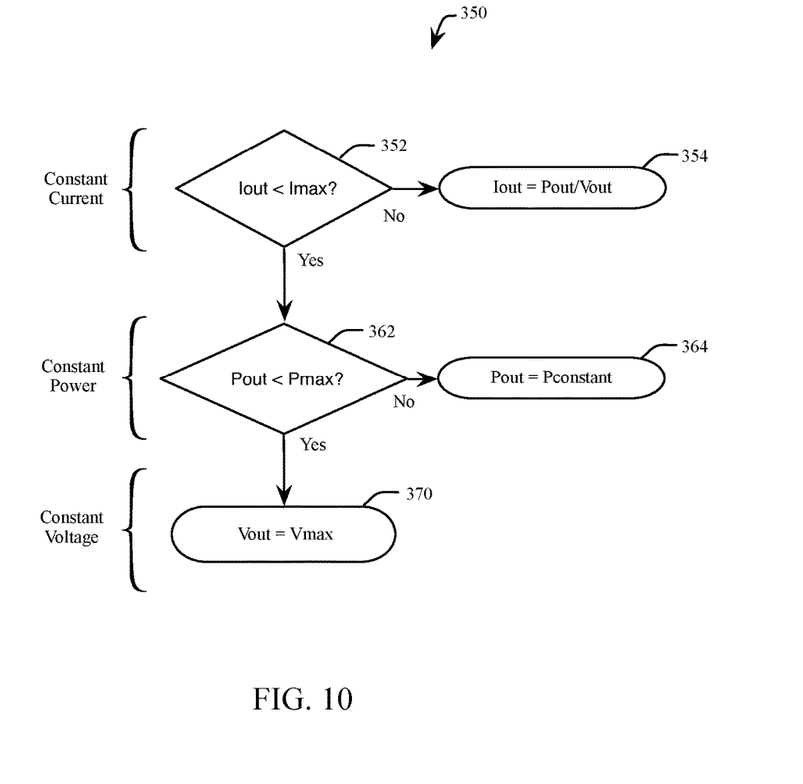
FIG. 10 is a flowchart representation of a method for regulating the flyback converter shown in FIG. 4, in accordance with an embodiment of the present disclosure.

FIG. 10, with reference to FIG. 9, shows a method 350 for regulating a flyback controller. At 352, if the output current is not less than a maximum output current, an output current ratio is maintained at 354, (e.g. operating points 344 and 346 of FIG. 9). If the output current is less than the maximum output current, then the output power limits are checked. At

362, if the output power is not less than a maximum output power, then a constant output power is maintained, (e.g. operating points 330 and 344 on CP 326 for a set point corresponding to 330). If the output power is less than a maximum output power, then the output voltage limits are checked at 370. At 370, the output voltage is limited to a maximum output voltage, (e.g. operating point 342 of FIG. 9). It should be understood that other embodiments, the evaluations at 352 and 362 of "being less than" are replaced with "being less than or equal to" with similar effect.

As will be appreciated, embodiments as disclosed include at least the following. In one embodiment, a resonant converter comprises a transformer including a primary winding magnetically coupled with reverse polarity to a secondary winding. The primary winding has a first terminal and a second terminal. An input voltage is connected between the first terminal and a ground reference. A primary-side switch is connected in series with the second terminal and a current sense module. The primary winding conducts a primary current from the first terminal to the ground reference in response to the primary-side switch being activated, and the secondary winding conducts a secondary current in response to the primary-side switch being deactivated. The resonant converter further comprises an active clamp flyback (ACF) controller comprising a current control circuit configured to maintain an output current equal to an output power divided by an output voltage in response to the secondary current being greater than or equal to a maximum output current. The output power is determined from the primary current sensed by the current sense module, and the output voltage is equal to a voltage across the secondary winding. A power control circuit is configured to maintain a constant output power in response to the output power being greater than or equal to a maximum output power, and the secondary current being less than the maximum output current. The constant output power is determined by a sample of the output voltage. A voltage control circuit is configured to limit the output voltage to a maximum output voltage in response to the secondary current being less than the maximum output current, and the output power being less than the maximum output power.

Alternative embodiments of the resonant converter include one of the following features, or any combination thereof. The output current is maintained by changing a duty cycle of the primary-side switch, the duty cycle determined by dividing an activation duration of the primary-side switch by an activation period. The constant output power is maintained by changing a duty cycle of the primary-side switch, the duty cycle determined by dividing an activation duration of the primary-side switch by an activation period. The determination of the output power comprises an integrator configured to integrate the primary current sensed by the current sense module, during an activation duration of the primary-side switch, to determine an integrated primary current, a peak detector configured to detect a peak of the integrated primary current, a multiplier circuit configured to multiplying the input voltage with the peak of the integrated primary current to form a numerator, wherein the input voltage is determined by a scaled voltage across an auxiliary winding magnetically coupled with the primary winding, and a divider circuit configured to divide the numerator by the activation duration to determine the output power. A low pass filter to dampen a high frequency oscillation of the primary current from the activation of the primary-side switch. The output voltage is determined by a scaled voltage across an auxiliary winding magnetically coupled with the primary winding. The secondary current is determined from the primary current sensed by the current sense module, and divided by a turns ratio, wherein the turns ratio equals a first number of windings of the primary winding divided by a second number of windings of the secondary winding, wherein the first number of windings is less than the second number of windings. A bridge rectifier is configured to rectify an alternating voltage to generate the input voltage. A rectifier is configured to generate a power source for the resonant converter from an auxiliary voltage across the auxiliary winding.

In another embodiment, a controller for a converter comprises a current control circuit configured to maintain an output current equal to an output power of the converter divided by an output voltage of the converter in response to a secondary current of a transformer of the converter being greater than or equal to a maximum output current, wherein the output current ratio is maintained by changing a duty cycle of a primary-side switch of the converter configured to gate a primary current of the transformer. A power control circuit is configured to maintain a constant output power in response to the output power being greater than or equal to a maximum output power, and the secondary current being less than the maximum output current, the constant output power determined by a sample of the output voltage, wherein the constant output power is maintained by changing the duty cycle of the primary-side switch. A voltage control circuit is configured to limit the output voltage to a maximum output voltage in response to the secondary current being less than the maximum output current, and the output power being less than the maximum output power.

Alternative embodiments of the controller for a converter include one of the following features, or any combination thereof. The determination of the output power comprises an integrator configured to integrate the primary current, during an activation duration of the primary-side switch, to determine an integrated primary current, a peak detector configured to detect a peak of the integrated primary current, a multiplier circuit configured to multiplying an input voltage of the converter with the peak of the integrated primary current to form a numerator, and a divider circuit configured to divide the numerator by the activation duration to determine the output power. A low pass filter (LPF) is configured to dampen a high frequency oscillation of the primary current from the activation of the primary-side switch. The duty cycle is determined by dividing an activation duration of the primary-side switch by an activation period equal to a period of an oscillator.

In another embodiment, a method for controlling a resonant converter comprises maintaining an output current equal to an output power of the resonant converter divided by an output voltage of the resonant converter in response to a secondary current of a transformer of the resonant converter being greater than or equal to a maximum output current, wherein maintaining the output current ratio comprises changing a duty cycle of a primary-side switch of the resonant converter configured to gate a primary current of the transformer. A constant output power is maintained in response to the output power being greater than or equal to a maximum output power, and the secondary current being less than the maximum output current, wherein the constant output power is determined by sampling the output voltage and maintaining the constant output power comprises changing the duty cycle of the primary-side switch. The output voltage is limited to a maximum output voltage in response to the secondary current being less than the maximum output current, and the output power being less than the maximum output power.

Alternative embodiments of the method for controlling a resonant converter include one of the following features, or any combination thereof. The duty cycle is determined by dividing an activation duration of the primary-side switch by an activation period equal to a period of an oscillator. The output power is determined by the steps of integrating the primary current, during an activation duration of the primary-side switch, to determine an integrated primary current, detecting a peak of the integrated primary current, multiplying an input voltage of the converter with the peak of the integrated primary current to form a numerator, and dividing the numerator by the activation duration to determine the output power. The input voltage is generated by rectifying an alternating voltage. The primary current is filtered with a low pass filter. The output voltage is determined by scaling a voltage across an auxiliary winding magnetically coupled with a primary winding of the transformer. A controller for the resonant converter is powered by rectifying the voltage across the auxiliary winding.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A resonant converter comprising:
    an active clamp flyback (ACF) controller configured to control a primary-side switch configured to be coupled to a primary winding of a transformer having the primary winding magnetically coupled with reverse polarity to a secondary winding, the primary winding having a first terminal and a second terminal wherein the primary-side switch is configured to be connected in series with the second terminal and a current sense module, the primary winding configured to have an input voltage connected between the first terminal and a ground reference, and conducting a primary current from the first terminal to the ground reference in response to the primary-side switch being activated, and the secondary winding conducting a secondary current in response to the primary-side switch being deactivated; and
    the active clamp flyback (ACF) controller comprising:
    a current control circuit configured to maintain an output current equal to an output power divided by an output voltage in response to the secondary current being greater than or equal to a maximum output current, the output power determined from the primary current sensed by the current sense module, and the output voltage equal to a voltage across the secondary winding,
    a power control circuit configured to maintain a substantially constant output power in response to the output power being greater than or equal to a maximum output power, and the secondary current being less than the maximum output current, the substantially constant output power determined by a sample of the output voltage, and
    a voltage control circuit configured to limit the output voltage to a maximum output voltage in response to the secondary current being less than the maximum output current, and the output power being less than the maximum output power.

2. The resonant converter of claim 1 wherein the output current is maintained by changing a duty cycle of the primary-side switch, and wherein the active clamp flyback (ACF) controller is configured to determine the duty cycle by dividing an activation duration of the primary-side switch by an activation period.

3. The resonant converter of claim 1 wherein the substantially constant output power is maintained by changing a duty cycle of the primary-side switch, and wherein the active clamp flyback (ACF) controller is configured to determine the duty cycle by dividing an activation duration of the primary-side switch by an activation period.

4. The resonant converter of claim 1 wherein the determination of the output power comprises:
    an integrator configured to integrate the primary current sensed by the current sense module, during an activation duration of the primary-side switch, to determine an integrated primary current,
    a peak detector configured to detect a peak of the integrated primary current,
    a multiplier circuit configured to multiply the input voltage with the peak of the integrated primary current to form a numerator, wherein the input voltage is determined by a scaled voltage across an auxiliary winding magnetically coupled with the primary winding, and
    a divider circuit configured to divide the numerator by the activation duration to determine the output power.

5. The resonant converter of claim 4 further comprising a low pass filter to dampen a high frequency oscillation of the primary current from the activation of the primary-side switch.

6. The resonant converter of claim 1 wherein the output voltage is determined by a scaled voltage across an auxiliary winding magnetically coupled with the primary winding.

7. The resonant converter of claim 1 wherein the secondary current is determined from the primary current sensed by the current sense module, and divided by a turns ratio, wherein the turns ratio equals a first number of windings of the primary winding divided by a second number of windings of the secondary winding, wherein the first number of windings is less than the second number of windings.

8. The resonant converter of claim 1 wherein the maximum output power is a predetermined value of the output power, the maximum output current is a predetermined value of the output current, and the maximum output voltage is a predetermined value of the output voltage.

9. A controller for a converter comprising:
    a current control circuit configured to maintain an output current equal to an output power of the converter divided by an output voltage of the converter in response to a secondary current of a transformer of the converter being greater than or equal to a maximum output current, wherein the output current ratio is maintained by changing a duty cycle of a primary-side switch of the converter configured to gate a primary current of the transformer;
    a power control circuit configured to maintain a substantially constant output power in response to the output power being greater than or equal to a maximum output power, and the secondary current being less than the maximum output current, the substantially constant output power determined by a sample of the output voltage, wherein the substantially constant output power is maintained by changing the duty cycle of the primary-side switch; and a voltage control circuit configured to limit the output voltage to a maximum output voltage in response to the secondary current being less than the maximum output current, and the output power being less than the maximum output power.

10. The controller of claim 9 wherein the maximum output power is a predetermined value of the output power, the maximum output current is a predetermined value of the output current, and the maximum output voltage is a predetermined value of the output voltage.

11. The controller of claim 9 wherein the determination of the output power comprises:

an integrator configured to integrate the primary current, during an activation duration of the primary-side switch, to determine an integrated primary current, a peak detector configured to detect a peak of the integrated primary current, a multiplier circuit configured to multiplying an input voltage of the converter with the peak of the integrated primary current to form a numerator, and a divider circuit configured to divide the numerator by the activation duration to determine the output power.

12. The controller of claim 11 further comprising a low pass filter (LPF) configured to dampen a high frequency oscillation of the primary current from the activation of the primary-side switch.

13. The controller of claim 9 wherein the controller is configured to determine the duty cycle by dividing an activation duration of the primary-side switch by an activation period equal to a period of an oscillator.

14. A method for forming a controller for controlling a resonant converter comprising:

configuring the controller to maintain an output current equal to an output power of the resonant converter divided by an output voltage of the resonant converter in response to a secondary current of a transformer of the resonant converter being greater than or equal to a maximum output current, wherein maintaining the output current ratio comprises changing a duty cycle of a primary-side switch of the resonant converter configured to gate a primary current of the transformer;

configuring the controller to maintain a substantially constant output power in response to the output power being greater than or equal to a maximum output power, and the secondary current being less than the maximum output current, wherein the substantially constant output power is determined by sampling the output voltage and maintaining the substantially constant output power comprises changing the duty cycle of the primary-side switch; and configuring the controller to limit the output voltage to a maximum output voltage in response to the secondary current being less than the maximum output current, and the output power being less than the maximum output power.

15. The method of claim 14 further comprising determining the duty cycle by dividing an activation duration of the primary-side switch by an activation period equal to a period of an oscillator.

16. The method of claim 14 further comprising determining the output power by the steps of:

integrating the primary current, during an activation duration of the primary-side switch, to determine an integrated primary current, detecting a peak of the integrated primary current, multiplying an input voltage of the converter with the peak of the integrated primary current to form a numerator, and dividing the numerator by the activation duration to determine the output power.

17. The method of claim 16 further comprising generating the input voltage by rectifying an alternating voltage.

18. The method of claim 16 further comprising filtering the primary current with a low pass filter.

19. The method of claim 14 further comprising determining the output voltage by scaling a voltage across an auxiliary winding magnetically coupled with a primary winding of the transformer.

20. The method of claim 14 including configuring the controller to use a first predetermined value for the maximum output power, to use a second predetermined value for the maximum output current, and use a third predetermined value for the maximum output voltage.

* * * * *